United States Patent [19]  [11] 3,882,013
Katsobashvili et al.  [45] May 6, 1975

[54] METHOD OF PRODUCING HIGHLY AROMATIZED LOW-SULPHUR HYDROCARBON PETROLEUM STOCK

[76] Inventors: Yakov Rafailovich Katsobashvili, ulitsa Vavilova, 49, kv. 43; Anatoly Sergeevich Serenko, 44 kvartal, ulitsa Volgina, korpus 2, kv. 135, both of Moscow, U.S.S.R.

[22] Filed: Mar. 15, 1973

[21] Appl. No.: 341,592

[52] U.S. Cl. .................... 208/60; 208/59; 208/95; 208/96; 208/112; 260/672; 260/674 H; 260/674 N
[51] Int. Cl. ............................................ C10g 13/02
[58] Field of Search ........... 208/112, 60, 59, 95, 96; 260/674 H, 674 N, 672 R

[56] References Cited
UNITED STATES PATENTS

| | | | |
|---|---|---|---|
| 2,908,628 | 10/1959 | Schneider et al. | 208/112 |
| 3,153,675 | 10/1964 | Mason | 260/672 R |
| 3,153,676 | 10/1964 | Allen et al. | 260/672 R |
| 3,204,006 | 8/1965 | Broughton | 260/674 H |
| 3,215,749 | 11/1965 | Johnson et al. | 260/674 H |

*Primary Examiner*—Herbert Levine

[57] ABSTRACT

A method of producing highly aromatized low-sulfur hydrocarbon oil stock involves destructive catalytic hydroaromatization of vacuum gas oil at temperatures of from 500° to 600°C, under a pressure of from 5 to 50 atm, at a space velocity of the stock feed of from 1 to 10 hr$^{-1}$, with a hydrogen-stock ratio of from 500 to 3000 nm$^3$ per ton of stock; isolating from the thus-obtained hydroaromatizate a fraction boiling between 200° to 300°–400°C and the residue boiling above 300°–400°C; isolating an aromatic concentrate from said hydroaromatizate fraction that boils between 200 to 300°–400°C.

A method of processing the thus-obtained said aromatic concentrate and said residue into carbon-black stock resides in a direct utilization of both either separately or in a mixture with each other at a ratio of from 100:6 to 100:60, respectively.

A method of processing said aromatic concentrate into naphthalene according to the invention resides in a direct hydrodealkylation of same in the presence of a catalyst containing the elements of Groups VI and VIII of the Periodic System, on solid carriers.

18 Claims, No Drawings

METHOD OF PRODUCING HIGHLY AROMATIZED LOW-SULPHUR HYDROCARBON PETROLEUM STOCK

The present invention relats generally to methods of producing highly aromatized concentrates of petroleum hydrocarbons and more specifically to a method for producing highly aromatized low-sulfur hydrocarbon petroleum stock used, say, for manufacturing active carbon black, as well as for $C_6$–$C_9$ aromatic hydrocarbons, naphthalene and some other products.

Naphthalene is known to be widely used in the organic-synthesis industry, a great majority thereof being employed, in particular, for manufacturing phthalic anhydride.

Active carbon black is known to be extensively used in the rubber, tire and paint-and-varnish industries, as well as in the production of various materials, such as electrodes, ebonite, etc.

The sources of low-sulfur petroleum stock suitable for the manufacture of naphthalene and carbon black are strictly limited and therefore use has to be made industrially of high-sulfur crude stock.

At present, for producing "petroleum" naphthalene use is made of aromatic concentrates from light catalytic or thermal cracking gas oils, as well as reforming distillates and some other petroleum products containing alkyl-naphthalenes (cf. U.S. Pat. Nos. 3,227,769 of 1966; 3,256,356 of 1966; 3,394,073 of 1968; USSR Inventor's Certificates: No. 148,037 of 1961; 149,770 of 1961; 168,273 of 1962; 166,657 of 1962).

The most widespread kinds of highly aromatized stock for producing naphthalene are aromatic concentrates obtained form catalytic gas oils by extraction or adsorption processes.

At present, the stocks used for producing carbon black are mostly highly-aromatized liquid oil products that boil between 200–270 to 420°–450°C. At present methods are known for producing highly aromatized stock to manufacture carbon black from catalytic and thermal cracking gas oils, from the products of pyrolysis of kerosene-gas oil fractions ("green bloom oil"), from coking gas oils, as well as from the extracts of selective oil treatment and the products of thermal cracking thereof.

Among the most widely used methods are those applied for producing highly aromatized stock involved in the manufacture of carbon black from catalytic and thermal cracking gas oils by taking out aromatic compounds therefrom by means of solvent treatment (with furfural, phenol, $SO_2$, etc.). Said methods are described in the patent literature: U.S. Pats. Nos. 2,764,527 of 1956; 2,917,370 of 1959; 2,794,710 of 1956; 2,895,895 of 1959; 2,866,689 of 1958; 2,915,372 of 1959; 2,779,664 of 1957; 2,778,715 of 1957; 3,413,211 of 1968; 3,349,028 of 1967; USSR Inventor's Certificates Nos. 219,053 of 1965; 235,277 of 1969; 166,693 of 1962.

The yield of highly aromatized stock obtained by the extraction of light catalytic gas oil, amounts to 14.3–18.6 wt.% as calculated for the original stock of the catalytic cracking process, i.e., vacuum gas oil.

Also in widespread use are methods of producing highly-aromatized stock suitable for the manufacture of carbon black by thermal cracking of petroleum distillates and by thermal cracking of gas oils resulting from catalytic and thermal cracking in a mixture with the extracts of selective treatment (cf. USSR Inventor's Certificates Nos 208,858 of 1965; 154,351 of 1961, and others).

The yield of highly aromatized stock obtained by thermal cracking of catalytic-cracking gas oils, equals 13–19 wt.% of the original stock used for the catalytic-cracking process.

Disadvantages inherent in the now-existing method of producing said highly aromatized kinds of stock are as follows:

a. scantiness of crude-stock sources and dependence of the latter upon the presence of secondary processes involved in petroleum processing, that is, catalytic and thermal cracking, reforming, pyrolysis and others;

b. multistage processes concerned, say, with the necessity of additional concentration of the aromatic hydrocarbon in the catalytic-cracking gas oil by way of thermal cracking of said gas oil, as well as with the involvement of hydrofining of the original sulturous stock for the cracking process, or that of cracking gas oils or aromatic extracts;

c. low yield of highly aromatized stock and, consequently, low yield of the products of its processing, viz., naphthalene and carbon black as referred, say, to the original stock for catalytic cracking.

Use of sulfurous and high-sulfur gas oils for the manufacture of naphthalene has been disclosed in a number of patents, such as U.S. Pats. Nos. 3,075,022 of 1963; 2,958,643 of 1960; 3,150,196 of 1964; 3,177,262 of 1965; British Pat. No. 965,872 of 1963; French Pat. No. 1,365,320 of 1964.

As a rule, by the currently used metods naphthalene is produced in two steps. The first step consists usually in hydrocracking and hydrodesulfurization of the original cracking gas oil or of the aromatic concentrate isolated therefrom. In this process non-aromatic compounds are converted into gas and gasoline and, in addition, partial hydrogenation of aromatic compounds and hydrofining occur. At the second step the hydrodesulfurized aromatic concentrate is subjected to hydrodealkylation, mostly the thermal type.

Multistage processes for the manufacture of naphthalene are disclosed also in U.S. Pats. Nos. 3,268,610 of 1966; 3,402,214 of 1968.

Production of naphthalene according to Belgian Pat. No. 629,521 of 1963, provides for a mandatory use at the 1st step (for a thermal or catalytic hydrocracking) of highly aromatized original stock containing from 50 to 90 wt.% aromatic compounds, largely (up to 80 percent of the total amount) alkyl-naphthalenes. Obtaining of such a stock is possible only when the processing of the straight-run original stock involves such processes as catalytic or thermal cracking, reforming, etc., as well as special methods of isolating aromatic concentrates, such as adsorption or extraction. Alkyl-naphthalenes do not undergo any considerable changes and are forwarded to the 2nd step, i.e., thermal hydrodealkylation to obtain naphthalene. Thus, the process for producing highly aromatized stock to manufacture naphthalene, according to said patent, is in fact a multistage one, while the naphthalene producing process disclosed therein, is unfit for straight-run kinds of stock with a low content of aromatic hydrocarbons and is dependent upon the sources of highly aromatized stock.

According to one known method (cf. USSR Inventor's Certificate No. 208, 858, of 1965), the 200°–475° fraction from the thermal cracking process, taken alone or in a mixture with the extracts of distillate oil production processes, catalytic gas oils, or gasoline pyrolysis tars is subjected to a repeated thermal cracking which adds to the number of steps of the method and reduces the yield of highly aromatized stock for producing carbon black.

According to another known method (cf. USSR Inventor's Certificate No. 154, 351 of 1961), catalytic gas oils and extracts of selective oil treatment are subjected to thermal cracking and extraction- or adsorption separation. In such cases, catalytic gas oils or extracts of selective oil treatment obtained from sulfurous petroleum grades, are subjected to hydrodesulfurization which complicates the process for producing highly aromatized stock.

Stock obtained by extraction of gas oils resulting from thermal cracking of mazout (cf. USSR Inventor's Certificate No. 219, 053, 1965) contains up to 3.5–4.0 wt.% suflur which exceeds the permissible level of sulfur content in stock for producing active carbon black.

The known methods of producing highly aromatized stock for manufacturing carbon black (cf. U.S. Pat. Nos. 3,281,351 of 1966 and 3,384,570 of 1968) are multistage ones and provide mostly for the production of ethylene, butylene and benzene from the narrow-range ligroin fraction by a variety of combinations of cracking, fractionation, reforming, dehydrogenation, hydrodesulfurization, extraction and hydrodealkylation processes. Highly aromatized stock for producing carbon black is in fact a by-product of mixing and has a low yield.

It is an object of the present invention to provide a method of producing highly aromatized low-sulfur crude stock from petroleum stock, enabling the products to be obtained with a reduced number of processing stages.

It is another object of the present invention to increase the yield of said crude stock.

It is one more object of the present invention to provide a method of producing highly aromatized, low-sulfur crude stock, that would be independent of the source materials resulting from secondary petroleum processing, including catalytic and thermal cracking, pyrolysis, coking, and others, i.e., would enable the use of a heavy petroleum-distillate stock.

Said objects have been accomplished by the provision of a method of producing highly aromatized low-sulfur crude stock, wherein according to the invention vacuum gas oil is subjected to catalytic destructive hydroaromatization at temperatures of from 500° to 620°C and pressures of from 5 to 50 atm and a space velocity of stock feed of from 1 to 10 hr$^{-1}$, the hydrogen-stock ratio ranging from 500 to 3000 nm$^3$/t, with subsequent isolation from the thus-obtained hydroaromatizate of a fraction that boils between 200° to 300°–400°C, which are isolated an aromatic concentrate and a residue that boils above 300°–400°C.

The term "vacuum gas oil" implies a petroleum fraction distilled off under vacuum and boiling between 300 to 450–560°C.

Vacuum gas oils can be used which are low-sulfur (with a suflur content from 0.6 to 0.8 wt.%), suflurous (with a sulfur content from 1.6 to 2.0 wt.%) and high-sulfur (with a sulfur content from 2.7 to 3.2 wt.%) oil.

As catalysts for the destructive hydroaromatization use can be made of the oxides of metals belonging to Group VI or VIII of the Periodic System on solid carriers. As an oxide of a metal of Group VI use is made of molybdenum oxide, and as solid carriers, of an active alumina or aluminosilicate. The preferable ratio of molybdenum oxide and alumina lies within 12:88 to 16:84.

Destructive hydroaromatization of vacuum gas oil, according to the method according to the invention, is carried out preferentially within a temperature range of 530°–600°C which ensures optimum conditions for carrying out the method.

The production process for highly aromatized low-sulfur raw stock, according to said method occurs preferably at a hydrogen pressure of 20–30 atm. It is within said pressure interval that conversion reactions of the starting crude-stock hydrocarbons occur, resulting in the formation of aromatic hydrocarbons, including bi- and polycyclic ones; said reactions involve no hydrogenation of thus-formed aromatic hydrocarbons.

Destructive hydroaromatization of vacuum gas oil, according to the invention, is performed preferably at increased space relocities of its feed (4–7 volumes per volume of catalyst per hour), in order to increase the production output of the plant and to suppress undesirable gas- and coke-forming reactions.

Destructive hydroaromatization of vaccum-distilled gas oil is conducted preferably with a hydrogen-to-vacuum gas oil ratio ranging within 1000 to 1500 nm$^3$/t which restricts the formation of coke on the catalyst, thereby retaining high activity of the latter.

According to the invention, the obtained hydroaromatizate is distilled to obtain the fraction that boils preferably between 200–220° to 300°–380°C and the residue that boils above 300°–400°C. Said wide-boiling fraction contains 65–75 percent aromatic hydrocarbons, including 28–33 wt.% naphthalenes, or totally 34–59 wt.% bi- and tricyclic hydrocarbons which are an indispensable component of the crude stock involved, in particular, for producing naphthalene and active carbon black. The residue of the hydroaromatization process boiling above 300°–400°C, contains 62–68 wt.% aromatic hydrocarbons, including up to 57 wt.% bi- and polycyclic ones, and can be used as a stock component for producing carbon black.

The residue boiling above 300°–400°C, can be partially or completely subjected to recycling to increase the yield of the desired medium-boiling hydroaromatization fractions and the content of aromatics in said fractions. The ratio between the recycle and the vaccum gas oil can be selected within 10:100 to 80:100.

From the hydroaromatizate fraction boiling between 200°–220°C to 300°–400°C there is isolated an aromatic concentrate by resorting to either the adsorption method or to extraction with phenol, furfural, SO$_2$, etc., whereby the content of aromatic compounds in the aromatic concentrate is ensured to 80–98 wt.%, including 44–49 wt.% of bicyclic ones.

The thus isolated aromatic concentrate is in fact a ready-to-use highly aromatized low-sulfur crude stock suitable for further processing.

Destructive hydroaromatization under the aforesaid conditions ensures high desulfurization of the starting vacuum gas oil (degree of desulfurization amounting to 80–90 percent), high content of aromatic hydrocarbons (60–75 wt.%), including bi- and polycyclic (34–59 wt.%) in the desired fractions boiling between 200°to 300°–400 C and in the residues. Besides, the method dispense with the preliminary hydrofining of the starting vacuum gas oil, as well as with an additional hydrofining of the hydroaromatization products, viz., the desired highly aromatized fractions isolated from said fractions of aromatic concentrates and residues.

Aromatic concentrates and residues of the hydroaromatization process obtained by the proposed method, are essentially highly aromatized low-sulfur crude stock of high quality. In the case of destructive hydroarmatization of sulfurous and high-sulfur vacuum gas oil, they contain a maximum 1.0–1.3 wt.% suflur which is 2–3 times as low as contained in the highly aromatized crude stock produced by the known methods.

A method of processing an aromatic concentrate, according to the present invention resides in that said concentrate is subjected directly to catalytic hydrodealkylation so as to obtain naphthalene. In this case, the aromatic concentrate under hydrodealkylation needs no additional hydrofining and hydrodesulfurization.

The hydrodealkylation process proceeds over solid-carrier catalysts containing the elements of Groups VI and VIII of the Periodic System, at a temperature of from 560° to 580°C, under a pressure of 30 atm, at a space velocity of the aromatic concentrate feed from 0.5 to 2.0 hr$^{-1}$, with the hydrogen-stock ratio of 500 to 1500 nm$^3$/t, involving recycling the residue that boils up above 230°C.

The highly aromatized low-sulfur crude stock, i.e., an aromatic concentrate resulting from the proposed method, can also be used for producing individual $C_6$–$C_9$ aromatic hydrocarbons (such as benzene, toluene, xylenes, etc.) by catalytic hydrodealkylation, can find application as a solvent, floatant, as well as for some other purposes.

The method of processing highly aromatized low-sulfur crude stock, according to the invention resides in that the aromatic concentrate and the residue boiling above 300°–400°C, either separately or in a mixture with each other, are used for producing carbon-black stock. When used in a mixture, said aromatic concentrate and said residue are taken at a ratio selected within 100:6 to 100:60.

Producing said kinds of highly aromatized low-sulfur crude stock by the proposed method and use of such types of crude stock for producing carbon-black stock or aromatic hydrocarbons, naphthalene inclusive, make it possible to substantially reduce the number of steps and operations involved, simplify process flowsheets used for production of said products and increase their yield with respect to the starting material, viz., vacuum gas oil, as compared to the now-existing methods.

The yield of highly aromatized low-sulfur crude stock resulting from the proposed method, is 2–3 times that of the same stock according to the known methods.

The yield of commerical naphthalene resulting from, say, hydrodealkylation of the crude stock obtained by the proposed method, is 2–4 times the yield of such produced by the known methods and process flowsheets.

As to its physico-chemical properties, hydrocarbon composition and distillation curve, aromatization factor, correlation index and H:C ratio, the crude stock obtained by the method of the invention is not inferior to oil stock obtained by the known methods.

The proposed method may be carried out in the refining industry within the framework of the now-existing process flowsheets used at refineries, including flowsheets for hydrogenation processing of sulfurous and high-sulfur oil stock.

For a better understanding of the present invention, the following illustrative examples are given hereinbelow with reference to the appended table.

Examples 1 through 5 illustrate the processes for obtaining a highly aromatized low-sulfur crude stock intended for producing naphthalene, and results of exemplary production of same, whereas Examples 6 through 12 illustrate the results of obtaining a highly aromatized low-sulfur crude stock that may be used for producing active carbon black.

EXAMPLE 1

A sulfurous vacuum gas oil, characterized by the following properties: density at 20°C, 0.8845; refractive index, 1.4946; molecular weight, 300; iodine number, 2.3; contents of sulfonable compounds, 42.2 vol.%; solidification point, +17°C; elementary composition, wt.%: C —85.03; H—12.96; S —1.97; O+N —0.04; distillation, wt.%: from boiling point to 250°C —1.8; 250°–300°C —8.40; 300°–350°C —22.20; 350°–400°C —29.20; 400°–450°C - 26.30; above 450°C —12.10; group hydrocarbon analysis as resulting from adsorption separation, wt.%: paraffin-naphthenes —53.1; aromatic compounds —42.4%; resins and losses —4.5%; carbon distribution (according to the n-d-M analysis), wt.%: aromatic structures, 18.8; naphthenic structures, 16.8; paraffinic strcutres, 64.4 was subjected to destructive hydroaromatization.

The vacuum gas oil was fed, along with hydrogen, to the stock preheater to be heated to 560°, and therefrom to the destructive-hydroaromatization reaction vessel with an active catalyst containing 14 percent molybdenum oxide on alumina. The process was carried out at a gauge pressure of 30 atm, a temperature of 560°C within the reaction zone and a space velocity of the stock feed equal to 6.0 hr$^{-1}$, the hydrogen-to-stock ratio ranging within 1300 to 1400 nm$^3$/t.

The reaction products from the reactor were fed successively to the cooler and the separators operating under a pressure of 30 atm and at atmospheric pressure, wherein the hydrogen-containing gas was separated from the liquid products, viz., hydroaromatizate. Then the latter was subjected to treatment with a 10-percent NaOH solution, washed with water, dehydrated and subjected to fractional distillation on a rectification column to separate 50.8 wt.% (as referred to the starting raw material) of the desired fraction that boils between 200°–350°C and 2 percent of a residue boiling above 350°C. The 200°–350°C fraction was subjected to adsorption separation on silica gel to isolate an aromatic concentrate therefrom. The yield of the aromatic concentrate as referred to the original vacuum gas oil was equal to 32.7 wt.%.

The thus-obtained highly aromatized low-sulfur crude stock, viz., an aromatic concentrate was sujected, with a view to producing naphthalene, to catalytic hydrodealkylation which was carried out in the presence of an alumina cobalt oxidemolybdenum oxide catalyst, containing 14.0 percent molybdenum oxide and 5.0 percent cobalt oxide on alumina, at a temperature of 580°C.

The yield of naphthalene with respect to the parent stock for hydrodealkylation was 18.8 percent, while that in terms of the original vacuum gas oil, 6.1 percent.

EXAMPLE 2

Under the conditions of Example 1 the destructive hydroaromatization of the vacuum gas oil was performed, involving recycling of the residue of the above 350°C, the recycle ratio being 100:15. The stage of hydrodealkylation was carried out under the conditions of Example 1 at 560°C. The yield of the desired fraction 200°–350°C was 46.8 percent, the yield of the aromatic concentrate, 32.0 percent by weight in terms of the vacuum gas oil.

The yield of naphthalene as referred to the starting stock of hydrodealkylation was 16.2 percent and to the starting stock of hydroaromatization, viz., vacuum gas oil, 5.2 percent by weight.

Under the conditions of Example 2 the hydrodealkylation stage was run at 575°C.

EXAMPLE 3

The yield of naphthalene in terms of the hydrodealkylation parent stock was 23.6 wt.%, that in terms of hydroaromatization parent stock, i.e., vacuum gas oil, was 7.5 wt.%.

EXAMPLE 4

Destructive hydroaromatization of the vacuum gas oil as described in Example 1, containing 2.8 wt.% sulfur, was carrried out over a catalyst containing 12 percent molybdenum oxide on alumina at a temperature of 500°C, pressure of 5 atm, volumetric space velocity of stock feed of 1.0 hr$^{-1}$, hydrogen-stock ratio of 500 nm$^3$/t, with recycling of the residue boiling above 300°C, the recycle ratio being 100–30. The yield of the aromatic concentrate was 21.0 wt.% as referred to the vacuum gas oil.

The hydrodealkylation stage was carried out under the conditions of Example 1. The yield of naphthalene in terms of the parent stock of hydroaromatization, i.e., vacuum gas oil, was 3.1 wt.%.

EXAMPLE 5

Destructive hydroaromatization of the vacuum gas oil as described in Example 1, was carried out in the presence of a catalyst containing 16 percent molybdenum oxide on alumina, at a temperature of 600°C, pressure of 50 atm, space velocity of stock feed of 10 hr$^{-1}$, hydrogen-stock ratio of 3000 nm$^3$/t. The yield of the aromatic concentrate was 21.6 wt.% with respect to the vacuum gas oil. The hydrodealkylation stage was conducted under the conditions of Example 1 to obtain 4.3 wt.% naphthalene with respect to the starting vacuum gas oil.

EXAMPLE 6

Destructive hydroaromatization of the vacuum gas oil as described in Example 1, was carried out at a temperature of 560°C, pressure of 30 atm, space velocity of stock feed of 6 hr$^{-1}$, hydrogen-stock ratio within 1200–1300 nm$^3$/t over a catalyst containing 14 percent molybdenum oxide on alumina. The resultant hydroaromatizate was subjected to fractional distillation on a rectification column to isolate the desired fraction boiling between 200°–350°C and the residue boiling above 350°C. The 200°–350°C fraction was subjected to adsorption separation on silica gel to isolate an aromatic concentrate therefrom. The yield of the aromatic concentrate was 29.3 wt.% and of the residue boiling above 350°C, 7.0 wt.% as referred to the vacuum gas oil. Then the isolated aromatic concentrate was mixed with the residue boiling above 350° to obtain 36.3 wt.% of a mixture, viz., highly aromatized low-sulfur crude stock which can be used for producing carbon black. For the characteristics of the desired product refer to the table hereinbelow.

EXAMPLE 7

Under the conditions of Example 6, the hydroaromatizate was subjected to fractional distillation to isolate the 200°–330°C fraction and the residue boiling above 330°C. Then the aromatic concentrate with a yield of 24.8 wt.% as referred to the starting vacuum gas oil was obtained from the 200°–330° fraction by the adsorption method.

The thus-obtained aromatic conentrate was mixed with the residue boiling above 330°C (14.0 wt.% as referred to the vacuum-distilled gas oil) to obtain 38.8 wt.% of highly aromatized low-sulfur crude stock which can be used for producing carbon black. For the characteristics of the desired product refer to the table hereinbelow.

EXAMPLE 8

Under the conditions of Example 6, there was obtain from said vacuum gas oil 34.7 wt.% of highly aromatized low-suflur crude stock which can be used for producing carbon black. The characteristics of the desired product are given in the table hereinbelow.

EXAMPLE 9

The vacuum gas oil described in Example 1, was hydroaromatized under the following conditions of destructive hydroaromatization: temperature within the reaction zone, 600°C; space velocity of stock feed, 6.0 hr$^{-1}$; pressure, 30 atm; hydrogen-stock ratio within 1300–1400 nm$^3$/t. From the resultant hydroaromatizate there were distilled fractions boiling below 300°C to obtain 21.2 wt.% of the residue boiling above 300°C, viz., highly aromatized low-sulfur crude stock which can be used for producing carbon black. The characteristics of the stock are found in the table hereinbelow.

EXAMPLE 10

Under the conditions of Example 9 the reaction was carried out at the hydrogen-stock ratio of 1000 nm$^3$/t obtain 18.4 wt.% of the residue boiling above 300°C, i.e., highly aromatized low-sulfur crude stock suitable for producing carbon black. For the characteristics of the product obtained refer to the table hereinbelow.

EXAMPLE 11

Vacuum gas oil described in Example 1, with a sulfur content of 2.9 wt.%, was subjected to destructive hydroaromatization in the presence of a catalyst containing 16 wt.% molybdenum oxide on alumina, at a temperature of 520°C, pressure of 10 atm, space velocity of stock feed of 1.0 hr$^{-1}$, hydrogen-stock ratio of 500 nm$^3$/t, whereupon an aromatic concentrate was isolated from the 200°–350° fraction by extraction with a yield of 21.6 wt.% viz., highly aromatized low-sulfur crude stock suitable for producing carbon black. The characteristics of the stock are specified in the table hereinbelow.

EXAMPLE 12

Vacuum gas oil described in Example 1, was subjected to destructive hydroaromatization in the presence of a catalyst containing 12 wt.% molybdenum oxide on alumina at a temperature of 620°C, pressure of 50 atm, space velocity of stock feed of 10 hr $^{-1}$, hydrogen-stock ratio of 3000 nm³/t, whereupon from the 220–380° fraction there was obtained 26.0 wt.% of an aromatic concentrate, viz, highly aromatized low-sulfur crude stock suitable for producing carbon black, the characteristics thereof being tabulated in the table hereinbelow.

Table

| Nos | Examples Characteristics | 6 | | |
|---|---|---|---|---|
| | | Aromatic concentrate 200–350° | Residue boiling above 350° | Mixture |
| 1 | 2 | 3 | 4 | 5 |
| I. | Yield as calculated for stock - vacuum gas oil, wt.% | 29.3 | 7.0 | 36.3 |
| II. | Physico-chemical properties: | | | |
| 1. | Density at 20°C | 1.0062 | 1.0104 | 1.0092 |
| 2. | Refractive index, $n_D^{20}$ | 1.5990 | 1.5856[r] | 1.5958 |
| 3. | Iodine number | 8.5 | 5.3 | 8.0 |
| 4. | Content of sulfonatable compounds, vol.% | 100.0 | 65.0 | 93.8 |
| 5. | Molecular weight | 270 | 201 | 257 |
| 6. | Sulfur content, wt.% | 1.15 | 0.95 | 1.11 |
| 7. | Average boiling point, °C | 303 | 375 | — |
| 8. | Group hydrocarbon analysis, wt.%: | | | |
| | (a) Paraffin-naphthenes | — | 28.6 | 5.3 |
| | (b) Unsaturated and aromatic | 100 | 71.4 | 94.7 |
| 9. | Composition of aromatic component: | | | |
| | (a) monocyclic | 19.8 | 14.3 | 18.7 |
| | (b) bicyclic | 45.7 | 14.3 | 39.8 |
| | (c) tricyclic, resins and losses | 34.5 | 42.8 | 36.2 |
| 10. | H:C ratio | 1.23 | 1.25 | 1.23 |
| 11. | Aromatization factor | 162 | 207 | 171 |
| 12. | Correlation index | 97.7 | 98.2 | 97.9 |

| Nos | 7 | | | 8 | | |
|---|---|---|---|---|---|---|
| | Aromatic concentrate 200–330°C | Residue boiling above 330°C | Mixture | Aromatic concentrate 200–400°C | Residue boiling above 400°C | Mixture |
| | 6 | 7 | 8 | 9 | 10 | 11 |
| I | 24.8 | 14.0 | 38.8 | 32.7 | 2.0 | 34.7 |
| II | | | | | | |
| 1. | 0.9819 | 0.9830 | 0.9822 | 0.9950 | 1.0050 | 0.9960 |
| 2. | 1.5922 | 1.5760 | 1.5860 | 1.5900 | 1.5800[r] | — |
| 3. | 7.6 | 5.6 | 6.9 | 6.9 | 5.3 | 6.8 |
| 4. | 100.0 | 65.2 | 88.0 | 100.0 | 60.0 | 97.8 |
| 5. | 292 | 230 | 271 | 284 | 196 | 282 |
| 6. | 1.15 | 1.02 | 1.10 | 1.23 | 0.96 | 1.21 |
| 7. | 286 | 370 | — | 264 | 356 | — |
| 8. | | | | | | |
| a) | — | 28.2 | 10.1 | — | 33.1 | 2.0 |
| b) | 100 | 71.8 | 89.9 | 100 | 66.9 | 98.0 |
| 9. | | | | | | |
| a) | — | — | — | 31.4 | — | — |
| b) | — | — | — | 43.9 | — | — |
| c) | — | — | — | 24.7 | — | — |
| 10. | 1.16 | 1.24 | 1.18 | 1.20 | 1.26 | 1.21 |
| 11. | — | — | — | — | — | — |
| 12. | 96.2 | 85.8 | 92.5 | 106.3 | 96.2 | 105.6 |

| Nos | 9 | 10 | 11 | 12 |
|---|---|---|---|---|
| | Residue boiling above 300°C | Residue boiling above 300°C | Aromatic concentrate from 200–350°C fraction | Aromatic concentrate from 220–380°C fraction |
| | 12 | 13 | 14 | 15 |
| 1. | 21.2 | 18.4 | 21.6 | 26.0 |
| II. | | | | |
| 1. | 0.9689 | 0.9853 | 0.9800 | 1.0170 |
| 2. | 1.5679 | 1.5793 | 1.5730 | 1.6610 |
| 3. | 10.4 | 9.7 | 4.0 | 9.3 |
| 4. | 77.6 | 78.3 | 100.0 | 100.0 |
| 5. | — | — | 260 | 295 |
| 6. | 1.29 | 1.36 | 1.30 | 1.20 |
| 7. | 354 | 339 | 285 | 294 |
| 8. | | | | |
| a) | 22.4 | 18.4 | 10.0 | — |
| b) | 77.6 | 81.6 | 90.0 | 100 |
| 9. | — | — | 35.0 | 21.5 |
| a) | — | — | 45.5 | 40.2 |
| b) | — | — | 19.5 | 38.3 |
| c) | | | | |
| 10. | 1.29 | 1.27 | 1.32 | 1.15 |
| 11. | — | — | — | — |
| 12. | 80.6 | 91.4 | 92.0 | 102.5 |

[r] at 70°C

What is claimed is:

1. A method of producing highly aromatized low-sulfur hydrocarbon petroleum stock, comprising destructive catalytic hydroaromatization of a straight run vacuum distillate boiling between 300° to 450°–560°C at a temperature of from 500° to 620°C, under a pressure of from 5 to 50 atm and at a space velocity of stock feed from 1 to 10 $hr^{-1}$, the hydrogen-stock ratio ranging from 500 to 3000 $nm^3/t$; isolating from the resultant hydroaromatizate a fraction boiling between 200° to 300°–400°C, and a residue that boils at a temperature over 300°–400°C; and isolating an aromatic concentrate from said hydroaromatizate fraction boiling between 200° to 300°–400°C wherein the catalysts comprise the oxides of the metals of Groups VI and VIII of the Periodic System, on solid carriers.

2. A method as claimed in claim 1, wherein the vacuum- distillate is low-sulfur, sulfurous or high-sulfur vacuum gas oil.

3. A method as claimed in claim 1, wherein the oxide of the metal of Group VI is molybdenum oxide.

4. A method as claimed in claim 1, wherein the solid carrier is an active alumina or aluminosilicate.

5. A method as claimed in claim 1, wherein the catalyst has a molydbenum oxide-to-alumina ratio within 12:88 to 16:84.

6. A method as claimed in claim 1, wherein the destructive hydroaromatization of the vacuum distillate is carried out within a temperature range of 530° to 600°C.

7. A method as claimed in claim 1, wherein the destructive hydroaromatization of the vacuum distillate occurs under a hydrogen pressure of from 20 to 30 atm.

8. A method as claimed in claim 1, wherein the destructive hydroaromatization of the vacuum distillate proceeds at a space velocity of its feed equal to 4–7 volumes per catalyst volume per hour.

9. A method as claimed in claim 1, wherein the destructive hydroaromatization of the vacuum distillate takes place at a hydrogen-stock ratio of from 1000 to 1500 $nm^3/t$.

10. A method as claimed in claim 1, wherein the products isolated from the hydroaromatizate are a fraction boiling between 200°–220° to 300°–380°C and a residue boling above 300°–400°C.

11. A method as claimed in claim 1, wherein the destructive hydroaromatization of the vacuum distillate involves recycling of the residue boiling above 300°–400°C.

12. A method as claimed in claim 1, wherein the aromatic concentrate is isolated from the hydroaromatizate fraction by the adsorption method.

13. A method as claimed in claim 1, wherein the aromatic concentrate is extraction--isolated from the hydroaromatizate fraction.

14. A method of processing the aromatic concentrate obtained according to claim 1, wherein said aromatic concentrate is subjected directly to hydrodealkylation to produce naphthalene.

15. A method as claimed in claim 14, wherein said aromatic concentrate is subjected to hydrodealkylation over catalysts selected from the group consisting of the elements of Groups VI and VIII of the Periodic System on solid carriers, at a temperature from 560° to 580°C, under a pressure of 30 atm, at a space velocity of feed of the aromatic concentrate ranging from 0.5 to 2.0 $hr^{-1}$, with the hydrogen-stock ratio of from 500 to 1500 $nm^3/t$, involving recycling of the residue boiling above 230°.

16. A method of processing the stock obtained according to claim 1, wherein said aromatic concentrate is converted into carbon-black stock.

17. A method of processing the stock obtained according to claim 1, wherein the residue boiling above 300°–400°C is converted into carbon-black stock.

18. A method of processing the stock obtained according to claim 1, wherein to produce carbon-black stock, there are mixed the aromatic concentrate and the residue boiling above 300°–400°C, the ratio therebetween ranging from 100:6 to 100:60, respectively.

* * * * *